(12) United States Patent
Choi

(10) Patent No.: US 7,518,268 B2
(45) Date of Patent: Apr. 14, 2009

(54) LINEAR STAGE INCLUDING AN INTEGRATED ACTUATOR AND ASSOCIATED METHODS

(75) Inventor: Dong H. Choi, Palo Alto, CA (US)

(73) Assignee: Bookham Technology PLC, Caswell, Towcester, Northamptonshire (GB)

( * ) Notice: Subject to any disclaimer, the term of this patent is extended or adjusted under 35 U.S.C. 154(b) by 301 days.

(21) Appl. No.: 11/285,716

(22) Filed: Nov. 21, 2005

(65) Prior Publication Data
US 2007/0133117 A1 Jun. 14, 2007

(51) Int. Cl.
*H02K 41/00* (2006.01)
(52) U.S. Cl. .............................. 310/12; 310/13; 310/15
(58) Field of Classification Search .................. 310/12, 310/13, 15
See application file for complete search history.

(56) References Cited

U.S. PATENT DOCUMENTS

| 5,400,674 | A | 3/1995 | Arnone et al. |
| 5,995,521 | A | 11/1999 | Moore et al. |
| 6,050,556 | A | 4/2000 | Masuda et al. |
| 6,174,102 | B1 | 1/2001 | Do et al. |
| 6,307,619 | B1 | 10/2001 | Galburt et al. |
| 6,462,914 | B1 | 10/2002 | Oveyssi et al. |
| 6,734,583 | B2 * | 5/2004 | Fujisawa et al. ............... 310/12 |
| 6,847,132 | B2 * | 1/2005 | Ukaji .......................... 310/12 |
| 6,849,970 | B2 * | 2/2005 | Watanabe .................... 310/12 |
| 2005/0129073 | A1 | 6/2005 | Nguyen et al. |
| 2005/0243875 | A1 | 11/2005 | Le et al. |

FOREIGN PATENT DOCUMENTS

WO   WO-2004/086572  A2   10/2004

OTHER PUBLICATIONS

C-Flex Bearing Co., Inc. (Date Unknown) "The Bearing Solution: Frictionless, Low Hysteresis Bearing for Angular Applications," located at C-Flex.com last visited Oct. 22, 2004, 5 pages.
Chai, H-D. (1998). "Voice-Coil Motors" Chapter 5 In *Electromechanical Motion Devices*, Prentice Hall PTR: Upper Saddle River, NJ, pp. 164-222.

* cited by examiner

*Primary Examiner*—Quyen P Leung
*Assistant Examiner*—Iraj A Mohandesi
(74) *Attorney, Agent, or Firm*—Morrison & Foerster LLP

(57) ABSTRACT

According to one example a linear translation stage is provided. The linear stage includes a first portion (e.g., a base portion) and a second portion (e.g., a stage portion) configured for relative translation with respect to each other. One of the first portion or the second portion has a coil associated therewith and the other of the first portion or the second portion has a magnetic source associated therewith. The magnetic source may include one or more magnets to produce a magnetic field that generally encompasses the coil such that current through the coil causes a force on the coil, thereby causing translation of the first portion relative to the second portion.

8 Claims, 4 Drawing Sheets

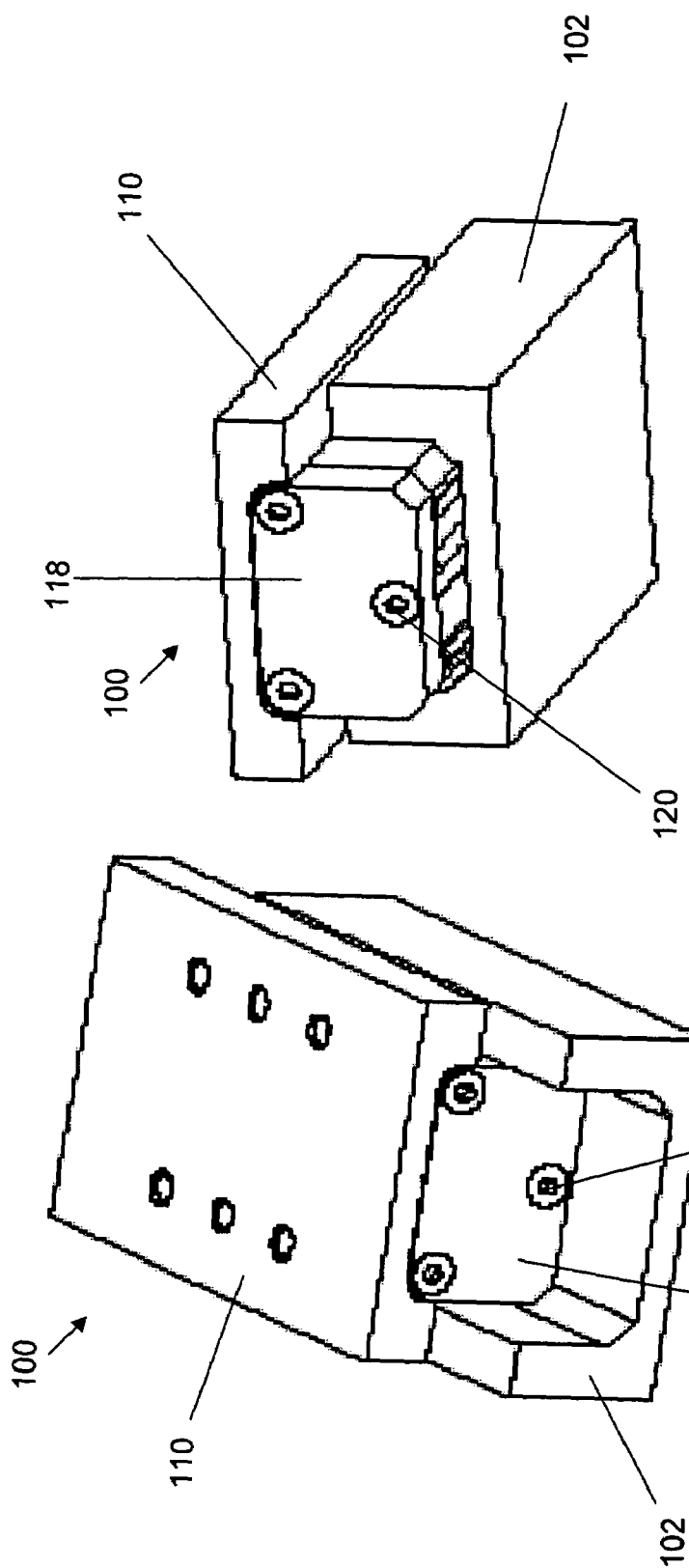

LINEAR STAGE INCLUDING AN INTEGRATED ACTUATOR AND ASSOCIATED METHODS

BACKGROUND

1. Field

The present invention relates generally to translating stages, and more particularly to translating linear stages including integrated actuators and associated methods of manufacture.

2. Description of Related Art

The use of adjustable mounting apparatus for supporting optical components, such as optical fibers, mirrors, beam splitters, lenses, gratings, and the like, is known. For example, it is frequently necessary to position a first optical element, such as an optical fiber or waveguide, relative to a second optical element, such as another optical fiber or waveguide, a microscope objective lens, or the like. Frequently, the relative positioning of such optical components is desirably very precise, with accuracy on the order of optical wavelength dimensions sometimes being necessary. Additionally, the relative positioning of such optical components is often desirably achieved quickly, e.g., within a fraction of second.

Common devices for providing varying positions within an optical system include translating linear stages. Generally, translating linear stages are placed adjacent to an actuator such as a stepper motor, dc current motor, piezoelectric actuator, manually operated micrometeres, or the like to cause translation of the stage. For example, a linear stage may include a base and a plate or stage that is capable of rectilinear movement with respect to the base. The base may be attached and immovable within a larger system, and an optical component or the like may be mounted to the stage for translation within the larger system. The actuator may be selectively controlled resulting in desired translation of the stage. Friction between moving parts of a translating linear stage device, e.g., the stage or base, may be reduced by roller bearings, liquid bearings, or the like.

Conventional actuators such as stepper motors, dc motors, or the like used with conventional linear stage devices generally do not have uniformity of speed (or linearity of motion) across low and high speed applications. Further, conventional actuators for translating linear stages take up space adjacent to the latter and may require periodic maintenance, such as monitoring or replacing lubrication between moving portions of the actuator and the like. Additionally, portions of the actuator that are in contact may further wear resulting in degradation of performance or failure of the device.

Manufacturing process of conventional linear stages including associated actuators as described generally require a number of processing steps associated with the actuator. For example, surface hardening steps may be needed to lengthen the life and reliability of actuator elements in contact such as rolling or bearing elements, and the like. Additionally, manufacturing tolerances of the linear stage and actuator may need to be very small to prevent build up of tolerances in the final stage device.

Accordingly, linear translation stages with an integrated actuator that take up less space and operates with increased uniformity over varying speeds, high efficiency, and with high repetition rates are desired.

SUMMARY

According to one aspect described herein a linear translation stage is provided. In one example, the linear stage includes a first portion (e.g., a base portion) and a second portion (e.g., a stage portion) configured for relative translation with respect to each other. One of the first portion or the second portion has a coil associated therewith and the other of the first portion or the second portion has a magnetic circuit associated therewith. The magnetic circuit may include one or more magnets to produce a magnetic field that generally encompasses the coil such that current through the coil causes a force on the coil, thereby causing translation of the first portion relative to the second portion. In one example, the coil (associated with the first or second portion and in a magnet field generated by the magnets) may operate in a fashion similar to a voice coil, e.g., wherein applying current through the coil causes a force exerted on the coil that translates the stage.

Additionally, an elongate center core may be disposed within the coil such that the coil is disposed in an air gap between the center core and the magnet. The core may be positioned between opposing end plates/magnets associated with the second portion, and a magnetic circuit may be formed at least partially from the magnets across the air gap, through the center core to the end plates, and back to the magnet.

The first portion may include a base portion of the stage device and the second portion may include a translating stage portion of the device. One or more sensors may be included to provide positional information of the relative movement of the stage portion and base portion. Such positional information may be used by a system to increase the accuracy of the stage position. Further, bearings such as mechanical bearings or fluid dynamic bearings may be disposed between relative moving parts of at the linear stage to reduce friction and the like.

In one example, a linear stage as described herein may be integrated within a larger device for supporting an optical component, for example. One exemplary device includes a cavity laser device incorporating a linear stage device as described herein. A portion of the linear stage, e.g., the base or stationary portion, may be integrated or monolithically formed as part of the device, e.g., formed with the base or package of the system. The second portions, e.g., the stage, may support and translate a component of the system.

According to another aspect, an exemplary method of manufacturing a linear stage having an integrated actuator is provided.

The present invention is better understood upon consideration of the detailed description below in conjunction with the accompanying drawings and claims.

BRIEF DESCRIPTION OF THE DRAWINGS

FIGS. 5A and 5B illustrate perspective views of an exemplary linear stage in an extended position.

DETAILED DESCRIPTION

The following description is presented to enable a person of ordinary skill in the art to make and use the various aspects and examples of the inventions. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the inventions. Thus, the present inventions are not intended to be limiting to the examples described and shown, but are to be accorded the scope consistent with the appended claims.

According to one aspect, an exemplary translational linear stage is provided herein. Broadly speaking, linear stages are devices which include a base and stage, wherein the base and stage are adapted for relative translation. An actuator is used to move the stage relative to the base. In one example described herein, a linear stage includes an integrated actuator for translating the stage relative to the base. The exemplary linear stage may be used in various applications such as optical systems or the like to effect translation of various components such as optical elements, optical fibers, waveguides, and the like relative to other components of the system.

The linear stage may be manufactured by various known methods and techniques. Components of the linear stage such as the base or stage may be obtained by removing material from a single monolithic structure using any suitable material removal technique(s) such as conventional machining, Electro-Discharge Machining (EDM), semiconductor processes, or the like. In other examples, features of the linear stage may be obtained by material addition techniques such as casting, molding, rapid prototyping, and the like. The linear stage may be made from a variety of materials, including, e.g., metals, ferromagnetic metals, polymers, single crystals, or the like. The magnet(s) may include a variety of magnetic materials such as rare-earth, Neodymium, ceramic magnetic materials, and the like. Additionally, in some examples, the linear stage may advantageously be fabricated in-situ, e.g., integrating or forming the base portion or the stage portion within a larger device or system.

A linear stage including an integrated actuator may provide a linear stage device with reduce power consumption over conventional linear stage designs, e.g., driven by stepper motors, dc motors or the like. Additionally, a linear stage having an integrated actuator may reduce premium space requirements.

Figure 2:
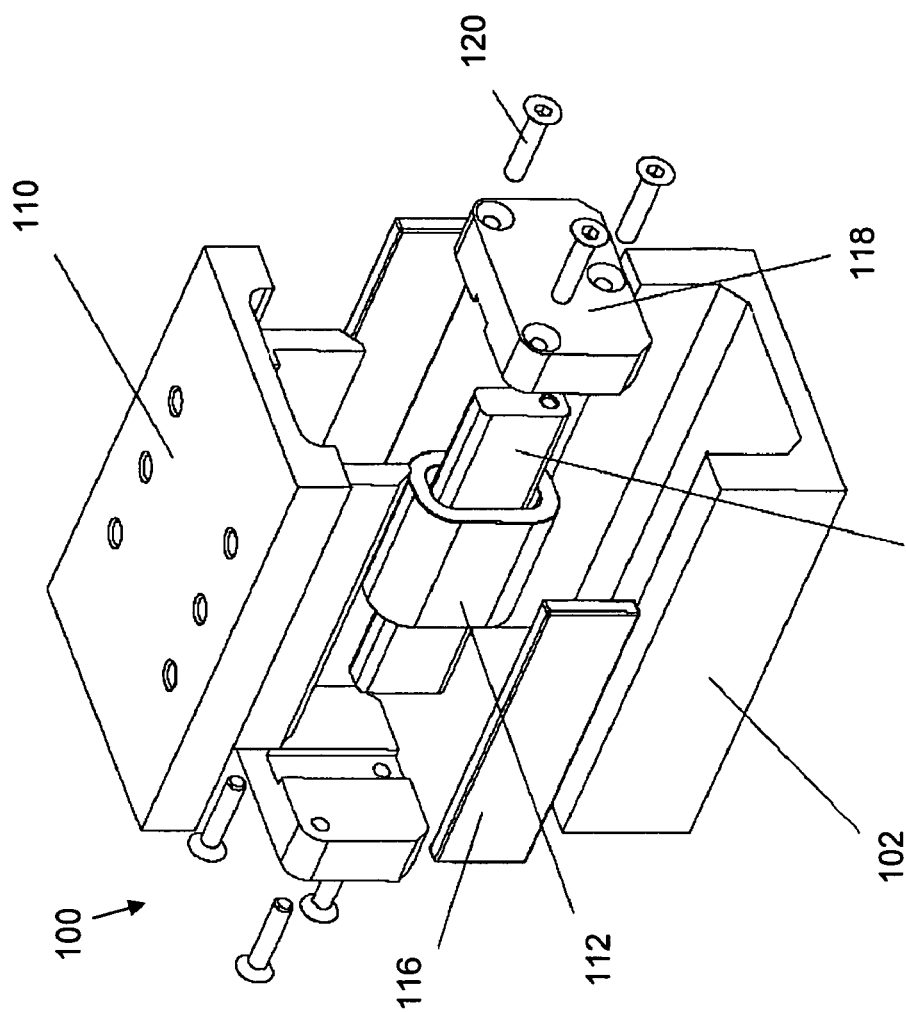
FIG. 2 illustrates an exploded view of an exemplary linear stage.
Figure 1:
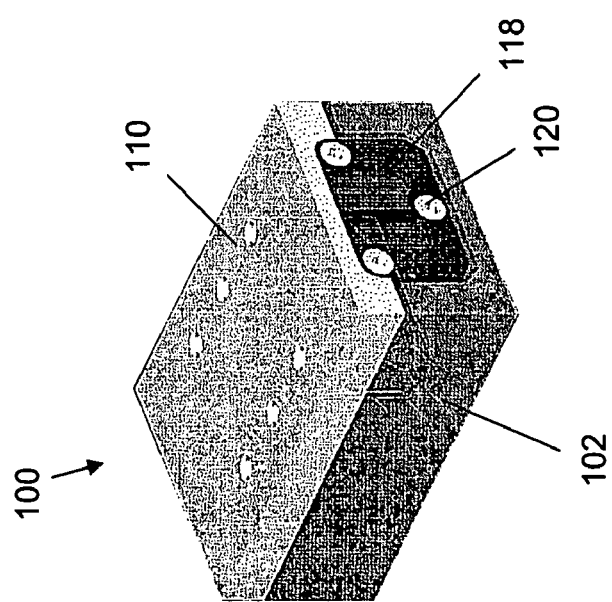
FIG. 1 illustrates a perspective view of an exemplary linear stage.

FIGS. 1 and 2 illustrate a perspective view and an exploded view, respectively, of an exemplary linear stage 100. In this example, linear stage 100 includes a base 102 and a coil 112 spatially fixed with respect to base 102. Linear stage 100 further includes a stage 110 having an elongate center core 114 held between end plates 118 and magnets 116 attached thereto. In particular, center core 114 is held between opposing end plates 118, which are in turn fixed to stage 110, and magnets 116 are held adjacent to and running substantially parallel to center core 114.

As known in a conventional voice coil actuator, relative translation may be achieved by applying a current through a coil disposed within a magnetic field. In this example, the magnetic field is generated by magnets 116 and current is applied to coil 112 to produce a force proportional to the current through coil 112. Current to coil 112 may be supplied and controlled via a controller or the like (not shown). The vertical span of coil 112 is disposed generally orthogonal to the magnetic field generated by magnets 116 such that current applied through coil 112 results in a force along the axis of coil 112. In one example, coil 112 includes a single wire wound a plurality of times into a loop or coil as shown. In other examples, multiple independent coils positioned within linear stage 100 are possible.

Figure 3:
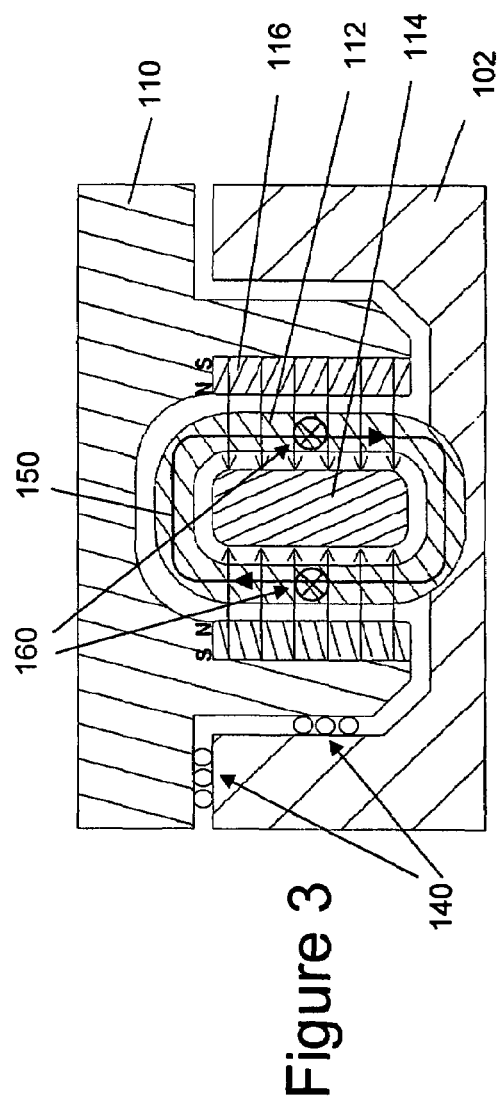
FIG. 3 illustrates a cross-sectional view of an exemplary linear stage with indications of electrical current, magnetic fields, and resulting forces within the linear stage.

Magnets 116 are disposed and oriented to create magnetic fields that act on opposing portions of coil 112 in opposite directions. For example, the magnetic field may be directed inward form opposing magnets 116 toward center core 114 or outward from center core 114 toward magnets. FIG. 3 illustrates a cross-sectional schematic view of linear stage 100 in greater detail and includes magnetic field lines generated by magnet 116 according to one example. As shown, the poles, indicated by north, "N", and south, "S", are arranged to oppose each other and produce a magnetic field directed into core 114 from both sides. Coil 112 is disposed in a gap between magnets 116 and center core 114 such that when current 150 is applied to coil 112, the forces 160 on the vertical sections of coil 112 are in the same direction (in this example, into the page).

Other configurations of magnetic circuits for generating a magnetic field are possible. For example, one or more magnets may be configured in various fashions to produce a suitable magnetic field to place coil 112. Additionally, a magnetic field may be created by passing current through a set of coils; appropriate positioning of one or more sets of coils may be used to produce a suitable magnetic field in the vicinity of coil 112.

FIG. 3 further illustrates a gap formed between base 102 and stage 110. Within at least a portion of this gap, bearings 140, such as mechanical bearings or fluid dynamic bearings may be included to reduce friction and facilitate translations between base 102 and stage 110 during operation.

Figure 4:
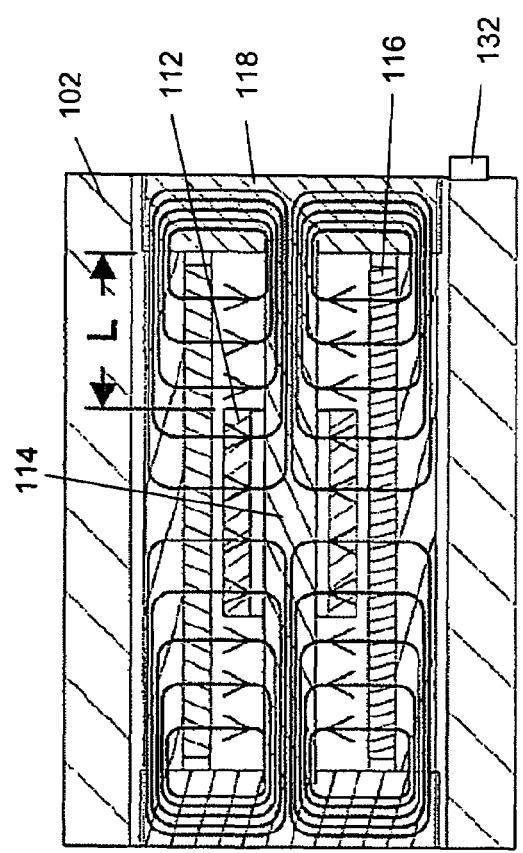
FIG. 4 illustrates a cross-sectional view of an exemplary linear stage with indications of magnetic fields within the linear stage.

FIG. 4 schematically illustrates another view of magnetic circuits formed with linear stage device 100. In particular, the magnetic field lines generated by magnets 116 are shown passing through the gap region between magnets 116 and center core 114 where coil 112 is disposed, and circulating through center core 114, end plates 118, and lower portions of stage 110, thereby completing the magnetic circuits. The addition of center core 114, end plates 118, and lower portions of stage 110 (where the magnetic field lines are shown passing through) create a more efficient magnetic circuit and stronger magnetic field in the gap region where coil 112 is disposed. Accordingly, in this example center core 114 and end plates 118 include suitable materials for forming the magnetic circuits as shown.

In this view, coil 112 is attached to base 102 and is stationary (or coil 112 is at least stationary with respect to base 102). The range of translation of stage 110 is given by "L", where L is the distance between the one end of coil 112 and end plate 118 as illustrated in FIG. 4. Increasing the distance L to increase the range of translation augments the reluctance of the magnetic circuit resulting in a smaller available force on coil 112. Accordingly, distance L and the range of translation may be adjusted for various applications and desired specifications of linear stage 100.

As described, current applied to coil 112 within the magnetic field produced by permanent magnets 116 causes relative movement of stage 110 and base 102. Varying the magnitude and direction of current through coil 112 may result in desired direction, acceleration, and deceleration of stage 110 relative to base 102. The force acting on coil 112 is generally proportional to the magnetic field intensity produced by magnets 116, electrical current through coil 112, and characteristics of coil 112, such as the number of wire turns (or windings)

of coil 112. Further, the magnetic field intensity in the air gap is generally a function of the "energy" or "strength" of the permanent magnets, e.g., magnets 116, the size or distance of the air gap, and the total reluctance of the magnetic circuit.

In one example, magnets 116 may include high energy magnets such as rare-earth, Neodymium, ceramic magnets, or the like to increase the force on coil 112 through increased magnetic field. In another example, the magnetic circuit (generally from magnets 116 across the air gap to core 114 and back through end plates 118 and stage 110) may be designed to minimize total reluctance and increase the force of the magnetic field on coil 112. Additionally, reduced air gaps may result in stronger magnetic fields in the air gap and vicinity of coil 112. Reduced air gaps may leave reduced space for coil 112; accordingly, the air gaps and thickness of coil 112 (e.g., the number of wire turns) may vary depending on the application and desired specifications.

The current through coil 112 may be varied to vary the force generated on coil 112 as well as the direction of the force; for example, increasing the current through coil 112 to generate more force on coil 112. Generally, a portion of the current is dissipated as Ohmic heat and may therefore limit the amount of current according to the ability of the device, e.g., base 102, to transfer heat from coil 112 to adjacent surfaces, a heat sink, or the like to keep temperatures below a desired level. For example, considerations such as demagnetization of the permanent magnets (e.g., magnets 116) or the re-flowing of an insulator coating of wire of coil 112 may determine maximum temperature limits. Additionally, the current may be limited by driver circuit considerations as well as other considerations not specifically mentioned herein.

Generally, the magnetic field intensity produced by magnets 116 across the length of stage 110, between opposing magnets 116, is not uniform. Because the magnetic field intensity is not uniform, the current-to-force ratio is not uniform. A linear stage device may be designed to increase the uniformity of the current-to-force ratio through various suitable optimization processes such as computer-based simulations, build-and-test methods, or the like. More uniform current-to-force ratios generally make for more simple driving circuits and control of the linear stage device.

Additionally, in some examples it may be desired to acquire positional information of the position of stage 110 during operation. Such information may be obtained by the use of any suitable sensor and provide feedback signals to a controller or processor that may result in motions of greater accuracy. Suitable sensors include, for example, capacitive sensors, magnetic sensors, optical encoders, and the like. In one example, an optical encoder may be used having a resolution of 5 nanometers or less. Accordingly, with suitable feedback circuits, linear stage 100 may effect movements of stage 110 to a precision of 5 nanometers or less. A sensor may be placed external or internal to linear stage 100. For example, sensor 132 (e.g., an optical sensor or the like) may be placed on a portion of base 102 for sensing a distance of translation of stage 110 relative to base 102. Indicia may be included on a portion of stage 110 to indicate the degree of translation. Those of ordinary skill in the art will recognize that various other sensors and configurations of one or more sensors are possible.

Figure 5C:
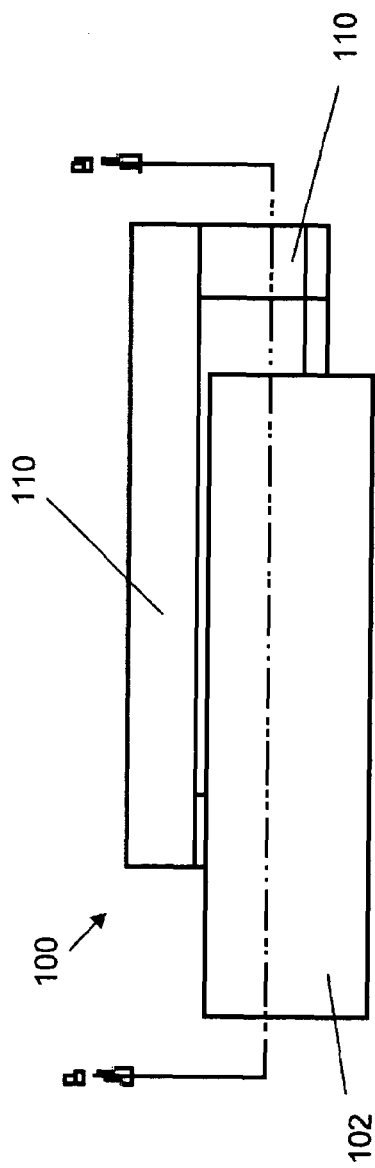
FIGS. 5C and 5D illustrate side and cross-sectional views of an exemplary linear stage in an extended position.
Figure 5D:
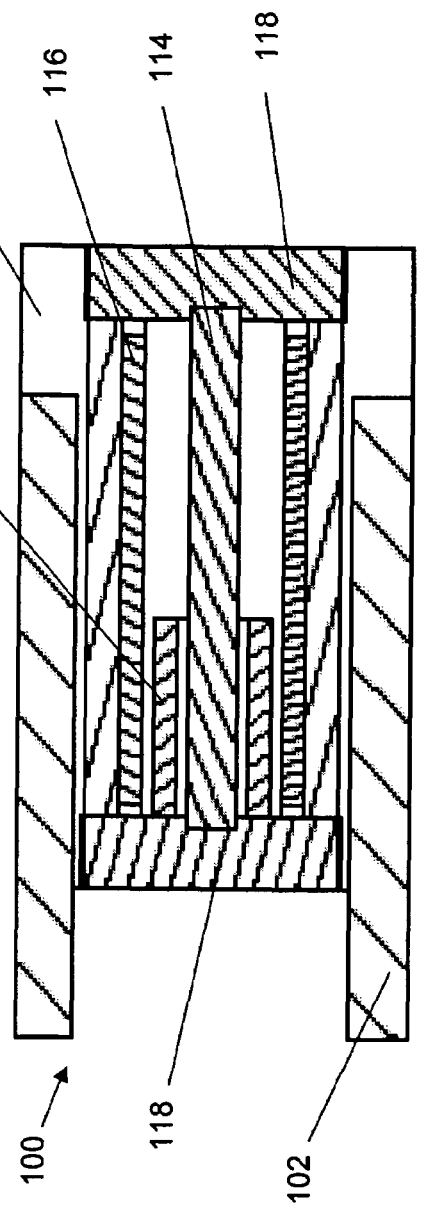

FIGS. 5A, 5B, 5C, and 5D illustrates various views of linear translation stage 100 in an extended position. In particular, FIGS. 5A and 5B illustrates perspective top and bottom views of translation stage 100, FIG. 5C illustrates a side-view of translation stage 100, and FIG. 5D illustrates a cross-sectional view of translation stage 100. With current applied to coil 112 in the presence of magnets 116, a force is created on coil 112 such that stage 110 moves relative to base 102. Shown clearly in FIG. 5D, stage 110 may extend a distance limited by the position of coil 112, which is spatially fixed with respect to base 102. Additionally, it is shown that end plates 118 are fixed to stage 110 via screws 120 and translate with stage 110 relative to base 102.

Those of ordinary skill in the art will recognize that other configurations of components described herein are possible. For example, a coil could be associated with the stage and magnetic elements associated with the base member. Further, various other stage and base structures are possible to provide a slidable engagement therebetween and support relative translation according to the integrated actuator.

Exemplary linear stages having an integrated actuator as described are generally well suited to deliver relatively high-speed stage motion with relatively high efficiency (ratio of mechanical power to electrical power) over conventional linear stages. In applications desiring alternating or scanning motions, the exemplary linear stages may deliver repetition rates of 1,000 Hz or more. Additionally, exemplary linear stages may be designed for fast scanning stages as well as high-resolution step-and-hold stages. Generally, the load, i.e., the inertia of the object that is moved by the translation stage, and the acceleration required, will define the force that the actuator needs to supply. This force in turn defines the combination of coil geometry and magnetic intensity needed. The magnetic intensity and packaging requirements define the geometry of the magnetic circuit.

Those of ordinary skill in the art will recognize that various aspects and examples described herein can be adapted to produce a rotary stage as well, wherein, instead of linear motion, angular motions are generated, either in scanning or in step-and-hold modes.

It will be understood that the terms "stationary" and "translating" as used herein with respect to base 102 and stage 110 are used for illustrative purposes only; in other examples, stage 110 may be held stationary with respect to base 102 and adapted to translate relative to stage 110 within a system. Further, in other examples, both base 102 and stage 110 are capable of moving relative to each other.

It will further be understood that the foregoing description and drawings of examples herein are merely illustrative of various principles of the inventions, and that various modifications can be made by one of ordinary skill in the art without departing from the scope and spirit of the inventions. For example, various examples described herein may be combined and altered with other devices and methods. Further, numerous other devices and processes not explicitly described herein may utilize the exemplary linear translation stage bearing described as will be recognized by those of ordinary skill in the art. Additionally, within the description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. An apparatus for moving a stage, the apparatus comprising:
   a first portion;
   a second portion, the second portion slidably engaged with the first portion, wherein one of the first portion and the second portion includes a stage;
   a coil associated with the first portion;

at least one magnetic source associated with the second portion and forming a closed-loop magnetic circuit, the at least one magnetic source for providing a magnetic field in the vicinity of the coil, whereby varying the current through the coil causes translation of the first portion relative to the second portion; and a center core spatially fixed with respect to the second portion, wherein the coil is disposed around the center core, and the center core is disposed between two endplates fixed to the second portion.

2. The apparatus of claim 1, wherein the coil and the at least one magnetic source form a voice coil actuator.

3. The apparatus of claim 1, wherein the at least one magnetic source comprises at least two permanent magnets.

4. The apparatus of claim 1, wherein the center core includes a ferromagnetic material.

5. The apparatus of claim 1, wherein the magnetic circuit is formed at least partially through the center core and end plates.

6. The apparatus of claim 1, wherein the coil is in a fixed spatial relationship with the first portion.

7. The apparatus of claim 1, further including a sensor positioned to sense relative movement of the first portion to the second portion.

8. An optical system including a translation stage as recited in claim 1.

* * * * *